United States Patent
Emrich et al.

(10) Patent No.: US 12,215,636 B2
(45) Date of Patent: Feb. 4, 2025

(54) PULSE MODULATION TECHNIQUE FOR GAS TURBINE ENGINES

(71) Applicant: Textron Innovations Inc., Providence, RI (US)

(72) Inventors: Joshua Andrew Emrich, Grapevine, TX (US); Thomas Dewey Parsons, Fort Worth, TX (US)

(73) Assignee: Textron Innovations Inc., Providence, RI (US)

(*) Notice: Subject to any disclaimer, the term of this patent is extended or adjusted under 35 U.S.C. 154(b) by 249 days.

(21) Appl. No.: 17/942,529

(22) Filed: Sep. 12, 2022

(65) Prior Publication Data

US 2024/0084742 A1    Mar. 14, 2024

(51) Int. Cl.
*F02C 9/32* (2006.01)
*B64D 31/00* (2006.01)
*B64D 45/00* (2006.01)

(52) U.S. Cl.
CPC ............... *F02C 9/32* (2013.01); *B64D 31/00* (2013.01); *B64D 45/00* (2013.01); *B64D 2045/0085* (2013.01); *F05D 2220/323* (2013.01); *F05D 2220/329* (2013.01)

(58) Field of Classification Search
CPC ..... F02C 9/32; F02C 9/28; F02C 9/42; B64D 31/00; B64D 45/00; B64D 2045/0085; B64D 31/06; F05D 2220/323; F05D 2220/329; B64C 27/04
See application file for complete search history.

(56) References Cited

U.S. PATENT DOCUMENTS

| | | |
|---|---|---|
| 10,961,915 B2 | 3/2021 | Simonetti et al. |
| 2018/0273196 A1 | 9/2018 | Bel |
| 2018/0319486 A1 | 11/2018 | Elyashiv et al. |
| 2019/0292982 A1* | 9/2019 | Winter ............... F02C 7/143 |
| 2020/0049025 A1 | 2/2020 | Morgan et al. |
| 2020/0255159 A1 | 8/2020 | Manoukian et al. |
| 2020/0362754 A1 | 11/2020 | Beauchesne-Martel et al. |
| 2021/0025333 A1 | 1/2021 | Morenko et al. |
| 2021/0140374 A1* | 5/2021 | Manoukian ............ F02C 9/18 |
| 2022/0185490 A1* | 6/2022 | Ricci ................... B60L 50/51 |

* cited by examiner

*Primary Examiner* — Behrang Badii
(74) *Attorney, Agent, or Firm* — Akona IP PC

(57) ABSTRACT

Various implementations described herein are related to an aircraft having a multi-engine configuration with multiple engines. The aircraft may have a flight control system coupled to the multiple engines with a multi-engine interface. The flight control system may be configured to reduce fuel consumption of at least one engine of the multiple engines during reduced-engine operation by pulse modulating fuel delivery to the at least one engine of the multiple engines.

15 Claims, 11 Drawing Sheets

Rotorcraft Architecture 104

PULSE MODULATION TECHNIQUE FOR GAS TURBINE ENGINES

STATEMENT REGARDING FEDERALLY SPONSORED RESEARCH OR DEVELOPMENT

Not applicable.

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In some aircraft designs, multiple engines are used to maintain a helicopter in flight. In some scenarios of saving fuel during in-flight cruise, twin engine control systems may turn one engine OFF or set an engine to IDLE. However, many risks are associated with turning an engine off during flight. For instance, if the operating engine fails during single-engine flight, then the off-line engine typically requires rapid restarting prior to safe landing. This may be difficult to implement in modern helicopter designs with conventional flight control systems, as the time to restart can take too long, which can adversely affect maintaining safe altitude during flight. A concern with setting an engine to IDLE is that it typically offers less fuel savings. As such, there exists a need to improve flight control systems for modern aircraft designs that provide a safe mode of engine operation that also reduces fuel flow during in-flight cruise.

BRIEF DESCRIPTION OF THE DRAWINGS

Implementations of various memory layout schemes and techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to pulse modulation schemes and techniques for gas turbine engines in aircraft, such as, e.g., a helicopter, a rotorcraft, a fixed-wing airplane, or some other type of similar aircraft. Also, various pulse modulation schemes and techniques described herein may be used in various types of aircraft and/or rotorcraft to reduce fuel flow (and fuel consumption) during in-flight cruise in IDLE or sub-IDLE operation conditions. For instance, continuous steady-state engine-speed targets below the standard operating speed of one or more engines may be used to thereby maintain IDLE or sub-IDLE conditions via oscillating fuel flow, which results in fuel savings. Therefore, the various pulse modulation schemes and techniques described herein may be used to achieve IDLE or sub-IDLE engine speed via oscillating fuel flow to reduce fuel consumption.

In addition, some implementations described herein are related to reduced-engine operation schemes and techniques for various types of aircraft, such as, e.g., a fixed-wing airplane, a helicopter, a rotorcraft or some other type of similar aircraft. Also, various reduced-engine operation schemes and techniques may be used in some types of rotorcraft having multi-engine configurations with multiple engines, such as, e.g., multiple turbo-shaft engines or other types of similar engines. While reduced-engine operation in multi-engine rotorcraft improves fuel efficiency, there are risks associated with turning-off an engine in flight. For instance, if the online engine were to fail, the off-line engine may need rapid restarting prior to a safe landing. Thus, various implementations described herein provide for a control technique and pilot display interface for implementing reduced-engine operation on a rotorcraft. As described herein, the methods, schemes and techniques described herein provide for real-time continuous calculation of a minimum altitude needed for reduced-engine operation by balancing aircraft descent rate with engine restart time. The methods, schemes and techniques described herein also provide a pilot display with a control interface, visual indications, status messages, and also associated caution-warning-advisory (CWA) messages. In some scenarios, the minimum altitude for reduced-engine operation is continually calculated as a function of various ambient conditions, wherein a sufficient altitude is necessary to operate the rotorcraft in a reduced engine operation (REO) mode.

Various implementations of reduced-engine operation schemes and techniques for various rotorcraft architectures will be described herein with reference to FIGS. 1-7.

Figure 1:
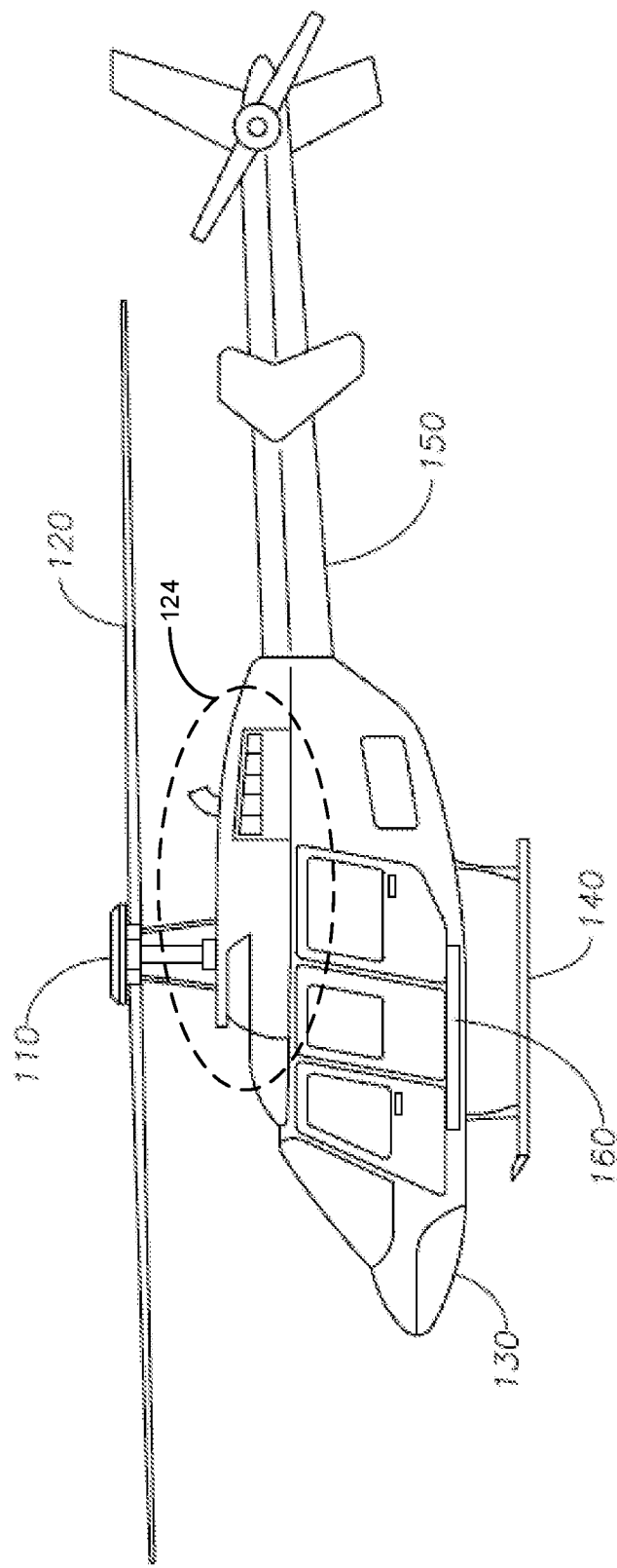
FIG. 1 illustrates a diagram of a rotorcraft architecture in accordance with various implementations described herein.

FIG. 1 illustrates a diagram 100 of rotorcraft architecture 104 in accordance with various implementations described herein. The rotorcraft architecture 104 may comprise an airplane, such as, e.g., a fixed-wing airplane, a helicopter, a rotorcraft or some other type of similar aircraft.

In various implementations, the rotorcraft architecture 104 refers to various types of rotary-wing aircraft, such as, e.g., a rotorcraft, a helicopter or similar. The rotorcraft 104 includes a rotor system 110, one or more blades 120, a fuselage 130, landing gear 140, and an empennage 150. The rotor system 110 is attached to an upper portion of the fuselage 130, and also, the rotor system 110 has an engine compartment 124 with multiple engines arranged in a multi-engine configuration. The rotor system 110 may be configured to rotate the blades 120 during flight, and also, the rotor system 110 may utilize a flight control system (not shown) for selectively controlling the pitch of each blade of the blades 120 so as to allow a pilot to selectively control direction, thrust, and/or lift of the rotorcraft 104.

Figure 2A:
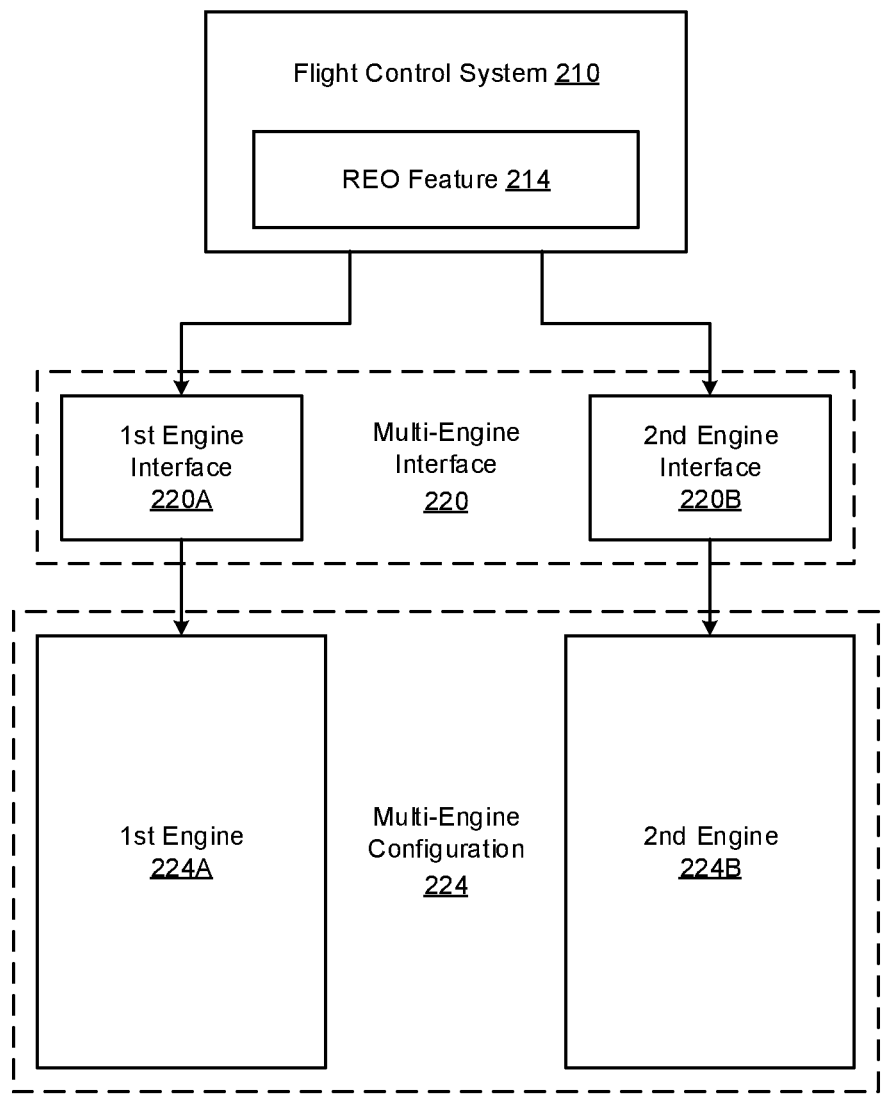
FIGS. 2A-2B illustrate diagrams of multi-engine architecture in accordance with various implementations described herein.
Figure 2B:
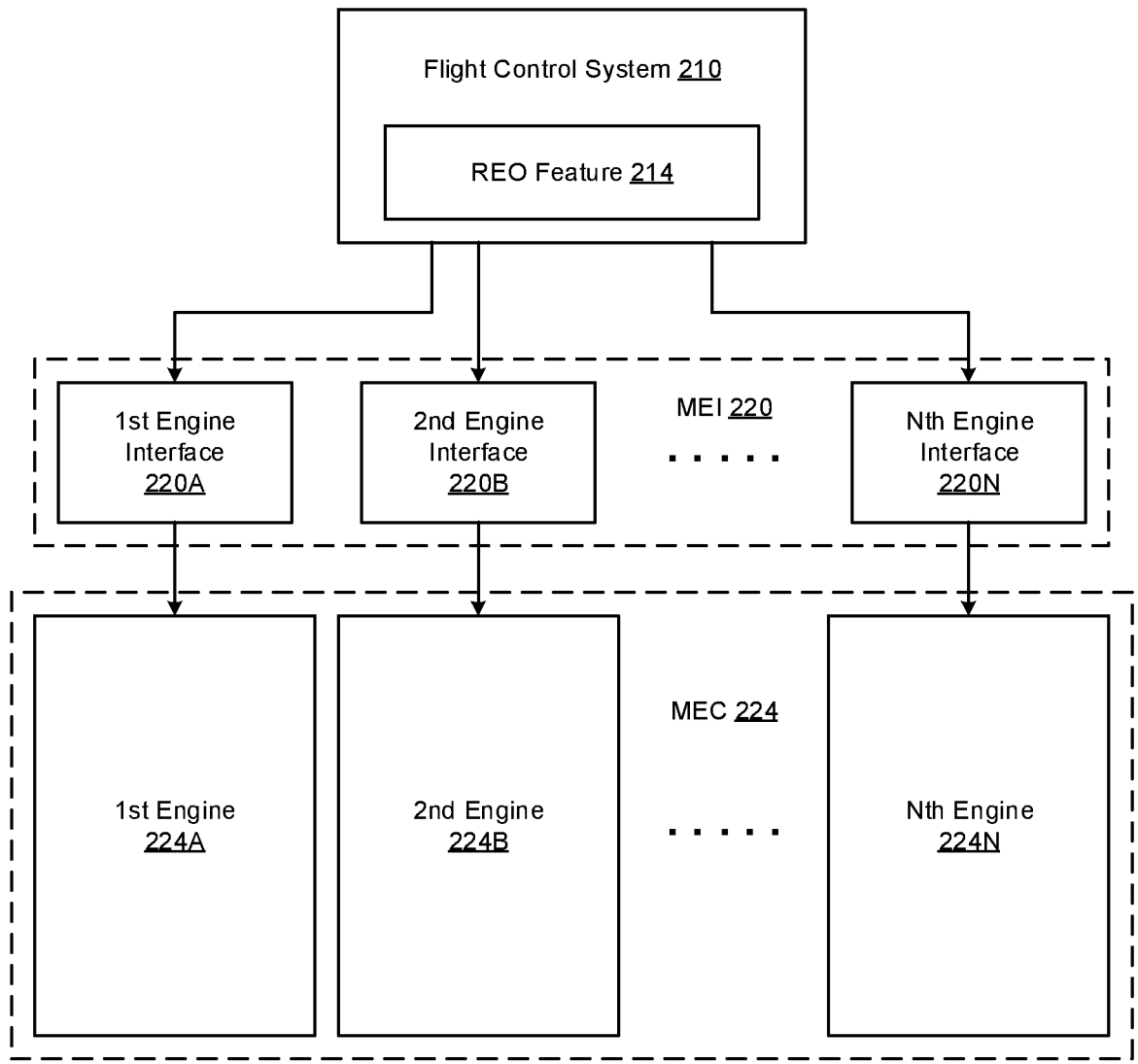
Figure 3:
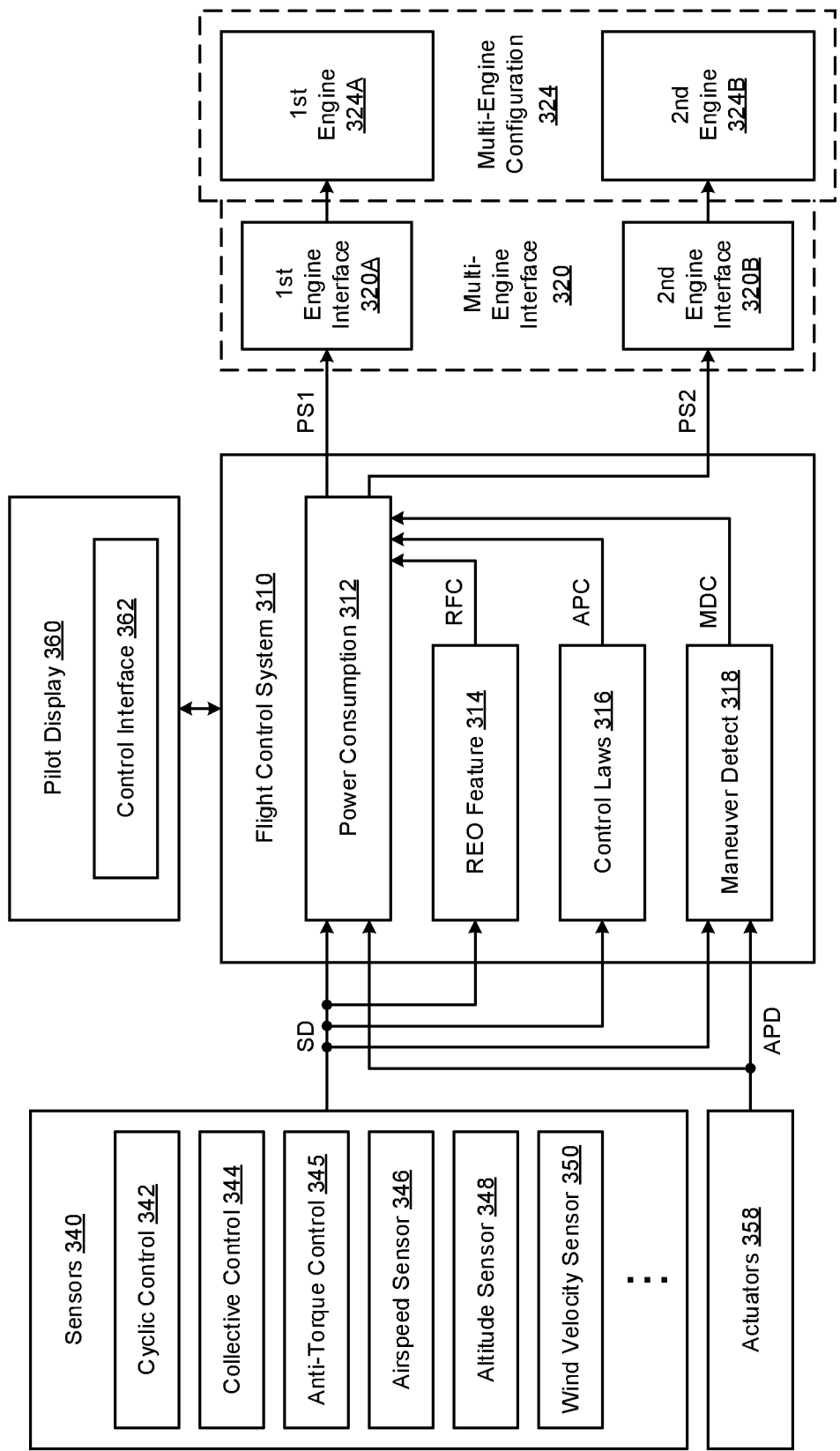
FIG. 3 illustrates a schematic diagram of a multi-engine flight formation system in accordance with implementations described herein.

As described in greater detail herein, the flight control system (e.g., as shown in FIGS. 2A-2B and 3) may be used to operate multiple engines in a reduced engine operation (REO) mode that refers to a high-efficiency mode of operation for shutting-down at least one engine of the multiple engines, e.g., during take-off, flight, and/or landing. In some scenarios, reduced engine operation (REO) may refer to a reduced-engine cruise mode of operation, such as, e.g., a single-engine cruise (SEC) mode of operation. In other scenarios, the flight control system may be configured to reduce fuel consumption of at least one engine of the multiple engines during reduced engine operation (REO) by pulse modulating fuel delivery to the at least one engine of the multiple engines. For instance, the flight control system may be configured to reduce fuel consumption while keeping the engine running so as to increase range, loiter time, etc. Also, safer full-power operation is rapidly restored (or re-established) since the reduced operation engine is not completely shutdown. Also, reduced engine coking and reduced engine operating temperatures may be achieved when compared to running a rich fuel mixture at steady-state IDLE or sub-IDLE operation.

FIGS. 2A-2B illustrate diagrams of multi-engine architecture 204 in accordance with various implementations described herein. In particular, FIG. 2A shows a diagram of a multi-engine architecture 204A with multiple engines, such as, e.g., two engines in a multi-engine configuration, such as, e.g., a twin-engine configuration, and in addition, FIG. 2B shows a diagram of another multi-engine architecture 204B with multiple engines, such as, e.g., two or more engines in a multi-engine configuration. The multi-engine architecture 204 may utilize a reduced engine operation (REO) technique for an aircraft or rotorcraft.

In various implementations, as shown in FIG. 2A, the multi-engine architecture 204A may be utilized in various types of aircraft, such as, e.g., the rotorcraft architecture 104 shown in FIG. 1, which may refer to a rotary-wing type of aircraft, such as, e.g., a helicopter or a similar type of rotorcraft. The multi-engine architecture 204A may include a multi-engine configuration (MEC) 224 with multiple engines 224A, 224B, such as, e.g., two engines in a twin-engine configuration. In addition, the multi-engine architecture 204A may include a flight control system 210 coupled to the multiple engines 224A, 224B with a multi-engine interface (MEI) 220 having multiple engine interfaces, including, e.g., a first engine interface 220A and a second engine interface 220B. In some scenarios, the flight control system 210 is coupled to the first engine 224A via the first engine interface 220A, and the flight control system 210 is also coupled to the second engine 224B via the second engine interface 220B. Also, the multi-engine configuration (MEC) 224 utilizes the multiple engines 224A, 224B, such as, e.g., multiple turbo-shaft engines or various other types of similar engines.

In some implementations, the flight control system 210 includes a reduced engine operation (REO) feature 214 (or control module) that is configured to implement the reduced engine operation (REO) technique. The flight control system 210 is configured to shutdown at least one engine of the multiple engines 224A, 224B during reduced engine operation (REO) by continuously calculating altitude (such as, e.g., minimum altitude) for the reduced engine operation (REO) based on one or more of an aircraft descent rate (ADR) of the aircraft (e.g., the rotorcraft) and an engine restart time (ERT) of the at least one engine selected for shutdown. In various implementations, the term shutdown may also refer to sub-idle pulse modulation of an engine, and also, REO may refer to sub-idle operation of an engine, idle operation of an engine, and/or pulse modulating an engine.

In some scenarios, as shown in reference to FIG. 2A, the multiple engines 224A, 224B may include two engines, and the reduced engine operation (REO) may refer to a reduced-engine cruise or a single-engine cruise (SEC) mode of operation for shutting-down at least one engine of the two engines. In some other scenarios, as shown in reference to FIG. 2B, the multiple engines 224A, 224B, . . . , 224N may include any number (N) of engines, such as, e.g., two or more engines, and also, the reduced engine operation (REO) may refer to a high-efficiency mode of operation for shutting-down one or two or more engines of the two or more engines. Also, the multi-engine configuration (MEC) 224A, 224B utilizes the multiple engines 224A, 224B, . . . , 224N, such as, e.g., multiple turbo-shaft engines or various other types of similar engines.

In some implementations, the aircraft descent rate (ADR) may be based on current ambient conditions related to the altitude, including, e.g., outside ambient temperature (OAT) during autorotation of the aircraft (e.g., rotorcraft) with the at least one engine of the multiple engines shutdown. Also, the engine restart time (ERT) may refer to a function of the current ambient conditions related to one or more of the altitude, outside ambient temperature (OAT), and measured gas temperature (MGT) of the engine. Also, the flight control system 210 may be configured to continuously calculate the altitude as a minimum altitude needed for reduced engine operation (REO) based on a pre-determined balance between the aircraft descent rate (ADR) and the engine restart time (ERT). Also, the term shutdown may refer to sub-idle pulse modulation of at least one engine, and REO may refer to sub-idle operation of an engine, idle operation of an engine, and/or pulse modulating an engine.

In various implementations, the flight control system 210 provides visual indication of the altitude to a pilot with a gauge including current altitude versus a minimum altitude for the reduced engine operation (REO). Also, the flight control system 210 may be configured to calculate the minimum altitude based on one or more of pressure altitude, density altitude and height above-ground-level (AGL), and the flight control system 210 may be configured to calculate the minimum altitude with an altitude margin built-in for safety. In some scenarios, the gauge may refer to a dedicated reduced engine operation (REO) display control panel that has an altitude gauge, one or more push buttons to engage/disengage the reduced engine operation (REO), and/or a visual display that displays status messages and caution-warning-advisory (CWA) messages related to the REO system. Also, in some scenarios, the flight control system 210 may be configured to prevent activation of the reduced engine operation (REO) when any FADEC caution-warning-advisory (CWA) messages are active. Also, the gauge provides a mode message that indicates availability of the reduced engine operation (REO) based on the current altitude versus the minimum altitude, and the gauge provides an engaged-disengaged message that indicates whether the reduced engine operation (REO) is currently engaged or disengaged.

In some implementations, the flight control system 210 is configured to selectively shutdown at least one engine of the multiple engines based on input from a pilot, and also, the flight control system 210 is configured to provide visual indication (e.g., via the gauge) of the at least one engine selectively shutdown by the pilot. As described herein, shutdown of at least one engine may also refer to sub-idle (or idle) pulse modulation of at least one engine, and REO may refer to sub-idle operation of at least one engine, idle operation of at least one engine, and/or pulse modulating at least one engine. Further, while in the reduced engine operation (REO) during flight, if the altitude as a current altitude drops significantly below the calculated minimum required altitude, then the flight control system 210 may be configured to automatically restart the shutdown engine and provide corresponding advisory messages to a pilot. In some scenarios, while in reduced-engine operation during flight, if the altitude as a current altitude drops below a predetermined altitude, such as, e.g., a minimum required altitude, then the flight control system 210 may be configured to automatically restart the shutdown engine and provide corresponding advisory messages to a pilot.

In some implementations, the flight control system may be configured to selectively reduce fuel consumption of at least one engine of the multiple engines during reduced engine operation (REO) during flight by pulse modulating fuel delivery to the at least one engine of the multiple engines. For instance, the flight control system may be configured to reduce fuel consumption while keeping the engine running so as to increase range, loiter time, etc. Also, the flight control system may be configured to rapidly restore (or re-establish) full-power during flight since the reduced operation engine is not completely shutdown. Also, the flight control system may be configured to reduce engine operating temperatures by running a less rich fuel mixture at steady-state IDLE or sub-IDLE operation.

In some implementations, when the reduced engine operation (REO) is selectively activated by a pilot during flight, the flight control system 210 may be configured to calculate and determine whether sufficient altitude is available and/or unavailable for reduced engine operation (REO). If the sufficient altitude is determined, then the flight control system 210 may be configured to allow engine shutdown of the at least one engine during the reduced engine operation (REO) and also provide an indication message (e.g., via the gauge) to the pilot that the reduced-engine operation is available and active. Also, if insufficient altitude is determined, then the flight control system 210 may be configured to prevent engine shutdown of the at least one engine during flight and provide a warning message (e.g., via the gauge) to the pilot that the reduced engine operation (REO) is unavailable and inactive. Also, during sub-idle (or idle) pulse modulation of an engine, indication of REO to a pilot may further refer to sub-idle operation of at least one engine, idle operation of at least one engine, and/or pulse modulation of at least one engine.

Further, in some implementations, upon selective activation of the reduced engine operation (REO) by a pilot, the flight control system is configured to adjust operation of the at least one engine of the multiple engines by throttling the at least one engine to IDLE, sub-IDLE, or completely OFF (i.e., completely shutdown), which may include pulse modulating at least one engine during IDLE or sub-IDLE operation. Also, upon activation of the reduced engine operation (REO) by a pilot, the flight control system 210 may be configured to reduce airspeed prior to shutdown of at least one engine of the multiple engines so as to prevent over-torque or over-temperature on at least one active engine of the multiple engines when the at least one engine of the multiple engines is shutdown.

In various scenarios, during take-off of the rotorcraft, the flight control system 210 may utilize the REO feature 214 to engage one engine or two engines based on the ambient conditions described herein. In other scenarios, during flight of the rotorcraft, the flight control system 210 may utilize the REO feature 214 to engage one engine or two engines for single-engine cruise (SEC) based on the ambient conditions described herein. In other scenarios, during landing of the rotorcraft, the flight control system 210 may utilize the REO feature 214 to engage one engine or two engines based on the ambient conditions described herein.

In various implementations, as shown in FIG. 2B, the multi-engine architecture 204B may be utilized in various types of aircraft, such as, e.g., the rotorcraft architecture 104 shown in FIG. 1, which may refer to a rotary-wing type of aircraft, such as, e.g., a helicopter or a similar type of rotorcraft. The multi-engine architecture 204B may include a multi-engine configuration (MEC) 224B with any number (N) of engines 224A, 224B, . . . , 224N, such as, e.g., two or three or more engines, and also, the reduced engine operation (REO) may refer to a high-efficiency mode of operation for shutting-down one or two or more engines of the two or three or more engines. Moreover, in various scenarios, the multi-engine configuration (MEC) 224B utilizes the multiple engines 224A, 224B, . . . , 224N, such as, e.g., multiple turbo-shaft engines or various other types of similar engines. Also, the multi-engine architecture 204A may have the flight control system 210 coupled to the multiple engines 224A, 224B, . . . , 224N with the multi-engine interface (MEI) 220 having any number (N) of engine interfaces 220A, 220B, . . . , 220N coupled to corresponding engines 224A, 224B, . . . , 224N. In some scenarios, the flight control system 210 may be coupled to the multiple engines 224A, 224B, . . . , 224N via the corresponding engine interfaces 220A, 220B, . . . , 220N.

In various implementations, the flight control system 210 has the reduced engine operation (REO) feature 214 (or control module) that is configured to implement the reduced engine operation (REO) technique. The flight control system 210 is configured to shutdown one or more engines of the multiple engines 224A, 224B, . . . , 224N during reduced engine operation (REO) by continuously calculating the minimum altitude required for the reduced engine operation (REO) based on one or more of an aircraft descent rate (ADR) of the aircraft (e.g., the rotorcraft) and an engine restart time (ERT) of the one or more engines selected for shutdown. In some scenarios, as shown in reference to FIG. 2B, the multiple engines 224A, 224B, . . . , 224N may have any number (N) of engines, such as, e.g., two or three or more engines, and also, the reduced engine operation (REO) may refer to a high-efficiency mode of operation for shutting-down one or two or more engines of the two or more engines. Also, the multi-engine configuration (MEC) 224B utilizes the multiple engines 224A, 224B, . . . , 224N, such as, e.g., multiple turbo-shaft engines or various other types of similar engines.

In various scenarios, during take-off of the rotorcraft, the flight control system 210 may utilize the REO feature 214 to engage one or two or more engines based on the ambient conditions described herein. In other scenarios, during flight of the rotorcraft, the flight control system 210 may utilize the REO feature 214 to engage one or two or more engines for the reduced engine operation (REO) based on the ambient conditions described herein. Further, in various other scenarios, during landing of the rotorcraft, the flight control system 210 may utilize the REO feature 214 to engage one or two or more based on the ambient conditions described herein. For instance, during flight of the rotorcraft, the flight control system 210 may utilize the REO feature 214 to engage three of five engines (or two of four engines) for the reduced engine operation (REO) based on the ambient conditions.

In various implementations, in reference to FIGS. 2A-2B, the flight control system 210 is configured to provide for every phase of air-flight of an aircraft, rotorcraft, helicopter or similar, including, e.g., take-off, flight, cruise, and landing. In various instances, each engine (e.g., each turbo-shaft engine) may have a gas generator and a free turbine supplied by the gas generator to provide power to the rotor blades. During all flight modes of operation, the power supplied to the rotor blades may range between pre-determined minimum values and maximum values. Also, each gas generator has an air compressor coupled to a combustion chamber to compress air and fuel for expansion in the turbine to thereby drive into rotation the compressor via driving shafts. The gases also drive a free power transmission turbine, and the free turbine transmits power via a power transfer box that centralizes the power supplied to the loads (e.g., rotor driving, pumps, alternators, starter/generator device, etc.).

In various implementations, the multiple engines in the multi-engine configurations are substantially similar or somewhat different, and each engine may be coupled to a driver in the engine interface. Also, each driver drives into rotation a corresponding gas generator and/or a starter for starting and/or re-starting a corresponding engine. During operation, each engine and driver combination may be managed, controlled and operated by the flight control system 210, which may be under supervisory control by a digital command device for flight motorization, such as, e.g., full-authority digital engine control (FADEC).

FIG. 3 illustrates a diagram 300 of a multi-engine flight formation system 304 in accordance with implementations described herein.

As shown in FIG. 3, the multi-engine flight formation system 304 may be used in various types of aircraft, such as, e.g., the rotorcraft 104 in FIG. 1. The multi-engine flight formation system 304 may have a flight control system 310 with a power consumption module 312, a reduced engine operation (REO) feature module 314, a control laws module 316, and a maneuver detect module 318. The power consumption module 312 may utilize a formation flight program that is executed on a flight control computer (FCC) in data communication with sensors 340, actuators 358, and an engine subsystem having a multi-engine interface 320 and a multi-engine configuration 324. The flight control system 310 may use the control laws module 316 to generate actuator position commands APC to move the actuators 358 based on sensor data SD from the sensors 340. The power consumption module 312 may use the sensor data SD from the sensors 340, actuator position commands APC, control laws module 316, actuator position data APD from actuators 358, or any combination thereof to determine and/or anticipate real-time power demand of multiple engines 324A, 324B, which may include any number of engines in a manner as described herein, e.g., in FIGS. 2A-2B.

In various implementations, the flight control system 310 is configured to generate and provide one or more power signals PS1, PS2 to the multi-engine interface 320 so as to modify and/or adjust power output of the multiple engines 324A, 324B. For instance, engine control may be performed in response to pilot commands or, in case of unmanned computer-controlled aircrafts (or auto-pilot mode), as directed by multi-engine flight formation system 304 of the rotorcraft. In various implementations, the multi-engine interface 320 may have multiple engine interfaces 320A, 320B to adjust the power output of the multiple engines 324A, 324B before application of the power signals PS1, PS2 by the power consumption module 312 to the multiple engines 324A, 324B so as to maintain the rotational speed of one or more blades 120 of the rotorcraft 104 within a determined aircraft positioning.

In some implementations, the sensors 340 may detect various flight parameters of the rotorcraft 104 to form the sensor data SD that is used by the power consumption module 312, either directly or indirectly, to control flight of the rotorcraft 104. The sensors 340 may have a cyclic control sensor 342 that detects position or motion of cyclic control, which forms part of the sensor data SD. The sensors 340 may have a collective control sensor 344 that detects a position or movement of the collective control of rotorcraft 104. The sensors 340 may also have an anti-torque control sensor 345 that detects a position or movement of the anti-torque control (e.g., pedal input) of the rotorcraft 104. The sensors 340 may have an airspeed sensor 346 (e.g., as part of a pitot-tube/pitot-system) that may utilize a doppler radar, global positioning satellites and/or other airspeed detection techniques. The sensors 340 may also have an altitude sensor 348, such as, e.g., a radar altimeter, an attitude sensor and/or an above-ground-level AGL detector. The sensors 340 may also have a wind velocity sensor 350. In various other instances, the different types of sensors 340 may also include an aircraft gross weight sensor (e.g., cargo weight sensor), a rotor speed sensor, a nacelle tilt angle sensor, a helicopter/tiltrotor aircraft pylon angle sensor, an engine power turbine output speed sensor, an engine gas temperature sensor, a throttle position sensor, an engine compressor speed sensor, an engine torque output sensor, an actuator position sensor, a pressure altitude sensor, a compressor air temperature sensor, a fuel metering valve position sensor, etc. Various other sensors may be used to perform other functions.

In various implementations, the flight control system 310 is configured to receive the sensor data SD from the sensors 340 and also receive the actuator position data APD from the actuators 358. In some scenarios, the sensors 340 may provide sensor data to the modules 312, 314, 316, 318, and the actuators 358 may provide actuator position data APD to the modules 312, 318. As such, the reduced engine operation (REO) feature module 314 may receive sensor data SD and provide REO feature command signals RFC to the power consumption module 312 based on the sensor data SD. Also, the control laws module 316 may receive sensor data SD and then provide actuator position command signals APC to the power consumption module 312 based on the sensor data SD. Further, the maneuver detect module 318 may also receive sensor data SD and then provide maneuver detect command signals MDC to the power consumption module 312 based on the sensor data SD. Moreover, the power consumption module 312 may receive data signals SD, SPD, receive command signals RFC, APC, MDC, and then generate and provide the power signals PS1, PS2 to the multiple engine interfaces 320A, 320B so as to thereby control the multiple engines 324A, 324B based on the data signals SD, SPD and the command signals RFC, APC, MDC. Also, in some scenarios, the flight control system 310 may provide audio/visual output to a pilot via a pilot display 360, wherein the pilot is able to interface with the flight control system 310 by way of a control interface 360 associated with the pilot display 360.

In some implementations, the flight control system 310 may be configured to use sensor data SD from the sensors 340 and actuator position data APD from the actuators 358 in combination with the modules 312, 314, 316, 318 so as to reduce fuel consumption of one or more engines in the multiple engine configuration. For instance, the flight control system 310 may be configured to oscillate (or pulse modulate) fuel flow to one or more engines so as to reduce fuel consumption over IDLE or sub-IDLE engine speed operations. In various scenarios, oscillations allow maintenance of IDLE or sub-IDLE conditions but with even lower mean fuel flow. The flight control system 310 may be configured to reduce fuel consumption while keeping the engine running so as to increased range, loiter time, etc. and also provide safer full power rapid restart since the REO engine is not completely shutdown. Also, in some operational scenarios, the flight control system 310 may also be configured to reduce engine coking and/or reduce engine operating temperatures compared to running a fuel rich mixture at steady-state IDLE or sub-IDLE.

In some implementations, the flight control system 310 is configured to reduce fuel consumption of at least one engine of the multiple engines 324A, 324B during flight and/or during reduced engine operation (REO) by pulse modulating fuel delivery to the at least one engine of the multiple engines 324A, 324B. Upon selective activation of the reduced engine operation (REO) by a pilot, the flight control system 310 is configured to adjust operation of at least one engine of the multiple engines 324A, 324B by throttling the at least one engine to IDLE or sub-IDLE. Also, upon selective activation of the reduced engine operation (REO) by a pilot, the flight control system 310 may be configured to maintain IDLE or sub-IDLE via oscillating fuel flow to the at least one engine during reduced engine operation (REO). Also, by maintaining an IDLE or sub-IDLE operational condition, the at least one engine may be configured with the capability for a faster engine restart time, e.g., since the at least one engine is not completely shutdown. Further, while in reduced engine operation (REO) during flight, if altitude drops significantly below a predetermined threshold, the flight control system 310 may also be configured to increase fuel delivery to the at least one engine and provide corresponding advisory messages to a pilot.

In some implementations, the flight control system 310 is configured to selectively shutdown at least one other engine of the multiple engines 324A, 324B based on input from a pilot, and the flight control system 310 may be configured to provide visual indication of the at least one other engine selectively shutdown by the pilot. Upon selective shutdown at least one other engine by the pilot, the flight control system 310 is configured to adjust operation of the at least one other engine of the multiple engines 324A, 324B by throttling the at least one other engine to IDLE, sub-IDLE, or completely OFF. While in reduced engine operation (REO) during flight, if altitude drops significantly below a predetermined threshold, the flight control system 310 is configured to automatically restart the at least one other engine and provide corresponding advisory messages to the pilot. Also, the flight control system 310 may be configured to shutdown the at least one other engine of the multiple engines 324A, 324B by continuously calculating the altitude for reduced engine operation (REO) based on at least one of an aircraft descent rate and an engine restart time of the at least one other engine. The aircraft descent rate may be based on current ambient conditions related to the altitude including, e.g., outside ambient temperature during autorotation of the aircraft with at least one engine of the multiple engines 324A, 324B shutdown. Also, the restart engine time may be a function of the current ambient conditions related to one or more of the altitude, outside ambient temperature, and measured gas temperature of the at least one engine.

Thus, in various implementations, the flight control system 310 may be configured to shutdown at least one engine of the multiple engines 324A, 324B during a single-engine cruise mode of operation. Further, the flight control system 310 may be configured to reduce fuel consumption of at least one other engine of the multiple engines 324A, 324B during the single-engine cruise mode of operation by pulse modulating fuel delivery to the at least one other engine of the multiple engines 324A, 324B.

The control laws module 316 may generate commands to maintain a suitable yaw, pitch and/or roll of the rotorcraft 104 along with issue commands to maintain the power output provided to the multiple engines 324A, 324B to maintain these three axes. The control laws module 316 may also issue other commands, such as, e.g., G-command, pitch rate feedback or similar, to regulate flight of the rotorcraft 104. The actuators 358 may have any type of actuator that moves a portion of the rotorcraft 104, such as, e.g., rotor blade assemblies, based on the sensor data SD. The actuators 358 may be individually moved between various actuator positions, and the actuators 358 may include main rotor actuators that are operable to adjust the pitch angle of the rotor blade assemblies, collectively and/or cyclically. In some instances, other types of actuators 358 that may be implemented include tail rotor actuators, control surface actuators and/or various other types of actuators.

In some implementations, the power consumption module 312 may be configured to anticipate additional power consumption on the multiple engines 324A, 324B using sensor data SD to form the power signals PS1, PS2 (e.g., power consumption signal). For instance, the power signals PS1, PS2 may be used by the engine interfaces 320A, 320B to adjust the power output of the multiple engines 324A, 324B. In some scenarios, the multi-engine flight formation system 304 may receive sensor data SD that includes a cyclic control position that is detected by the cyclic control sensor 342 so as to adjust the cyclic pitch of the rotor blade assemblies when an increased power output has been demanded from the multiple engines 324A, 324B. Therefore, the power signals PS1, PS2 may cause the engine interfaces 320A, 320B to increase the power output of the multiple engines 324A, 324B.

In some implementations, the multi-engine flight formation system 304 may further compensate for increases in power expectance and power consumption rate due to inputs in various axes, such as laterally or directionally, with differing ambient condition or vehicle state compensation schedules. For instance, in some scenarios, the multi-engine flight formation system 304 may be configured to filter the power signals PS1, PS2 to remove one or more steady components and/or shape the power signals PS1, PS2 to match a flight positioning for formation flight, which may be associated with one or more flight parameters detected by sensors 340. The multi-engine flight formation system 304 may also adjust the power signals PS1, PS2 based on various ambient conditions, such as, e.g., altitude data from the altitude sensor 348 and/or airspeed data from the airspeed sensor 346. Further, in some scenarios, when generating the power signals PS1, PS2, the multi-engine flight formation system 304 may provide differing weights to the sensor data SD, the actuator position commands APC, and/or the actuator position data APD, according to a weighting algorithm. For instance, the power consumption module 312 may attribute differing weights to the data provided by the various sensors 340. Moreover, the power consumption module 312 may weigh data from each of the cyclic control sensor 342, the altitude sensor 348 and the collective control sensor 140 differently when generating the power signals PS1, PS2.

In some implementations, the multi-engine flight formation system 304 may include the maneuver detection module 318 configured to detect various maneuvers (e.g., movement to determine power consumption) performed by the rotorcraft 104 based on the sensor data SD. The multi-engine flight formation system 304 may indirectly use the sensor data SD to form the power signals PS1, PS2 by processing the maneuvers detected by the maneuver detection module 318. Also, the multi-engine flight formation system 304 may have any other equipment that enables aircraft-to-aircraft communication (e.g., wireless networking).

In some implementations, the multi-engine flight formation system 304 may include the reduced-engine operations (REO) feature module 314 to provide the flight control system 310 with capability of a high-efficiency mode of operation for the rotorcraft 104. For instance, the flight control system 310 may be configured to interface with the multiple engines 324A, 324B, e.g., via the power signals PS1, PS2 provided to engine interfaces 320A, 320B. Also, the flight control system 310 may be configured to continuously calculate the minimum altitude of the rotorcraft 104 for reduced engine operation (REO) based on the aircraft descent rate (ADR) and/or the engine restart time (ERT). Also, the flight control system 310 may be configured to shutdown at least one engine of the multiple engines 324A, 324B if the calculated altitude is determined to be a sufficient altitude for reduced engine operation (REO). Also, after shutdown, the flight control system 310 may be configured to restart the at least one engine of the multiple engines 324A, 324B if the calculated altitude is determined to be an insufficient altitude for reduced engine operation (REO).

In some implementations, the aircraft descent rate (ADR) may be based on current ambient conditions related to the altitude (continuously calculated altitude) including outside ambient temperature (OAT), e.g., during autorotation of the rotorcraft 104, when the at least one engine of multiple engines 324A, 324B is shutdown. Also, the engine restart time (ERT) may be a function of the current ambient conditions related to the altitude, outside ambient temperature (OAT), and/or measured gas temperature (MGT) of the at least one engine. In addition, the altitude may be continuously calculated as a minimum altitude needed for the reduced engine operation (REO) based on a pre-determined balance between the aircraft descent rate (ADR) and the engine restart time (ERT).

In various implementations, the multi-engine flight formation system 304 may have the pilot display 360 with the control interface 362 incorporated as part thereof. For instance, in some scenarios, the flight control system 310 may provide audio/visual output to a pilot via the pilot display 360, wherein the pilot is able to interface with the flight control system 310 by way of the control interface 362 associated with the pilot display 360. Thus, the pilot may communicate with the flight control system 310 by way of the control interface 362 in the pilot display, and also, the flight control interface 310 may communicate with the pilot via the pilot display 360 and/or the control interface 362. Various aspects, features, characteristics, and behaviors that are associated with the pilot display 360 and/or the control interface 362 are described in greater detail herein with reference to FIGS. 4A-4B.

Figure 4B:
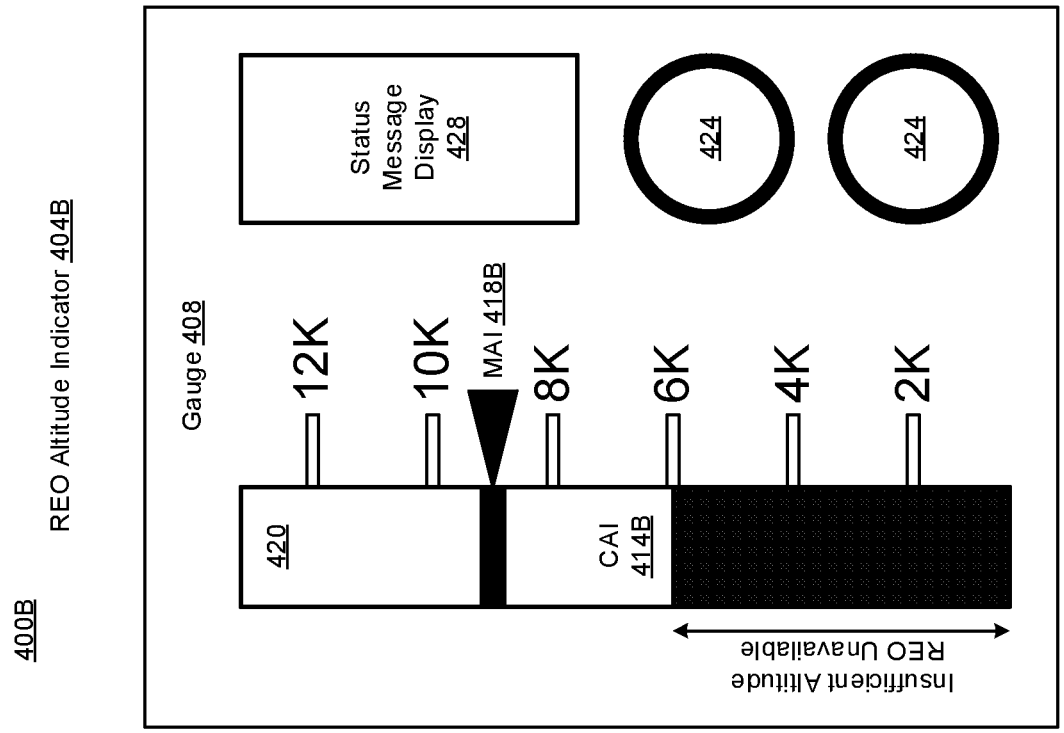
FIGS. 4A-4B illustrate diagrams of reduced-engine operation altitude indicator in accordance with various implementations described herein.
Figure 4A:
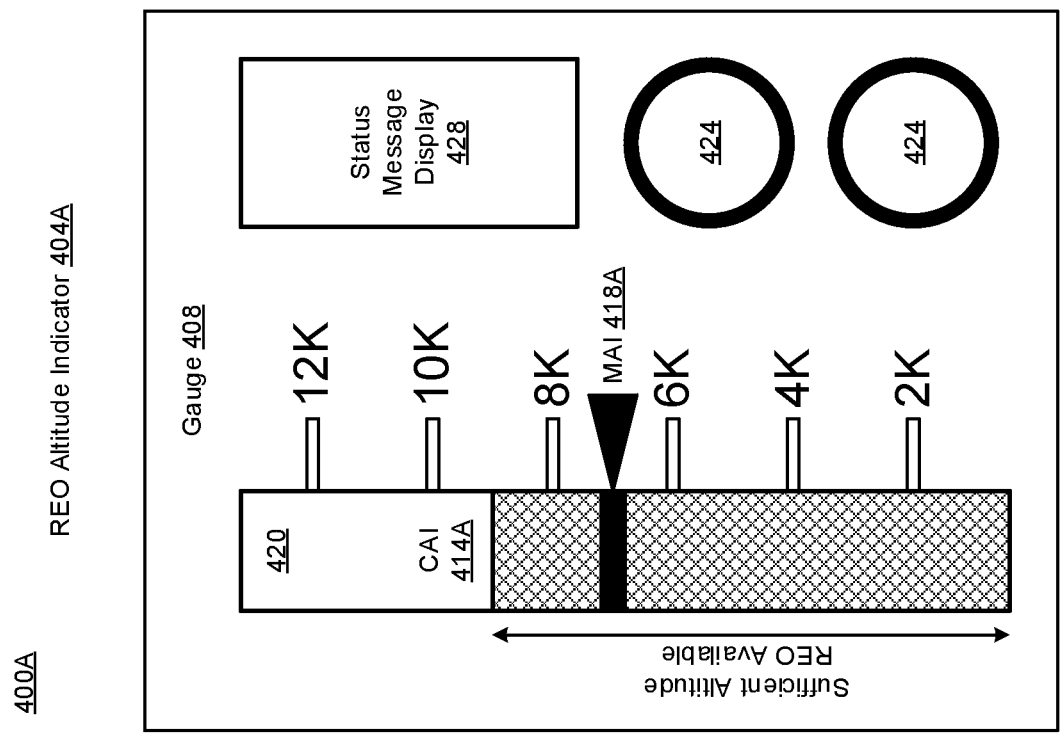

FIGS. 4A-4B illustrate diagrams of reduced-engine operation altitude indicator in accordance with various implementations described herein. In particular, FIG. 4A shows a diagram 400A of reduced engine operation (REO) altitude indicator 404A, and FIG. 4B shows a diagram 400B of reduced engine operation (REO) altitude indicator 404B.

In various implementations, as shown in FIGS. 4A-4B, the REO altitude indicator 404A, 404B may be used in the pilot display 360 in FIG. 3, wherein the flight control system 310 may be configured to provide visual indication of the altitude to a pilot with a gauge 408, including, e.g., a current altitude indication (CAI) versus a minimum altitude indication (MAI) for REO. In some instances, as shown in FIG. 4A, a current altitude indication (CAI) 414A is visually provided to the pilot when sufficient altitude makes REO available with a minimum altitude indication (MAI) 418A. In other instances, as shown in FIG. 4B, another current altitude indication (CAI) 414B is visually provided to the pilot when insufficient altitude makes REO unavailable with another minimum altitude indication (MAI) 418B.

The flight control system 310 may be configured to calculate the minimum altitude based on one or more of pressure altitude, density altitude and height above-ground-level (AGL), and the flight control system 310 may also be configured to calculate the altitude with an altitude margin built-in for safety. In some implementations, the gauge 408 may refer to a dedicated REO display control panel that has an altitude gauge 420, one or more push buttons 424 to engage/disengage REO, and a visual display 428 that displays various status messages and caution-warning-advisory (CWA) messages related to the REO system. Also, the flight control system 310 may be configured to prevent activation of the REO when caution-warning-advisory (CWA) messages are active. Also, the gauge 408 may provide a mode message that indicates availability of the REO based on the current altitude versus the minimum altitude, and also, the gauge 408 may provide an engaged-disengaged message that indicates the REO is currently engaged or disengaged.

Figure 5:
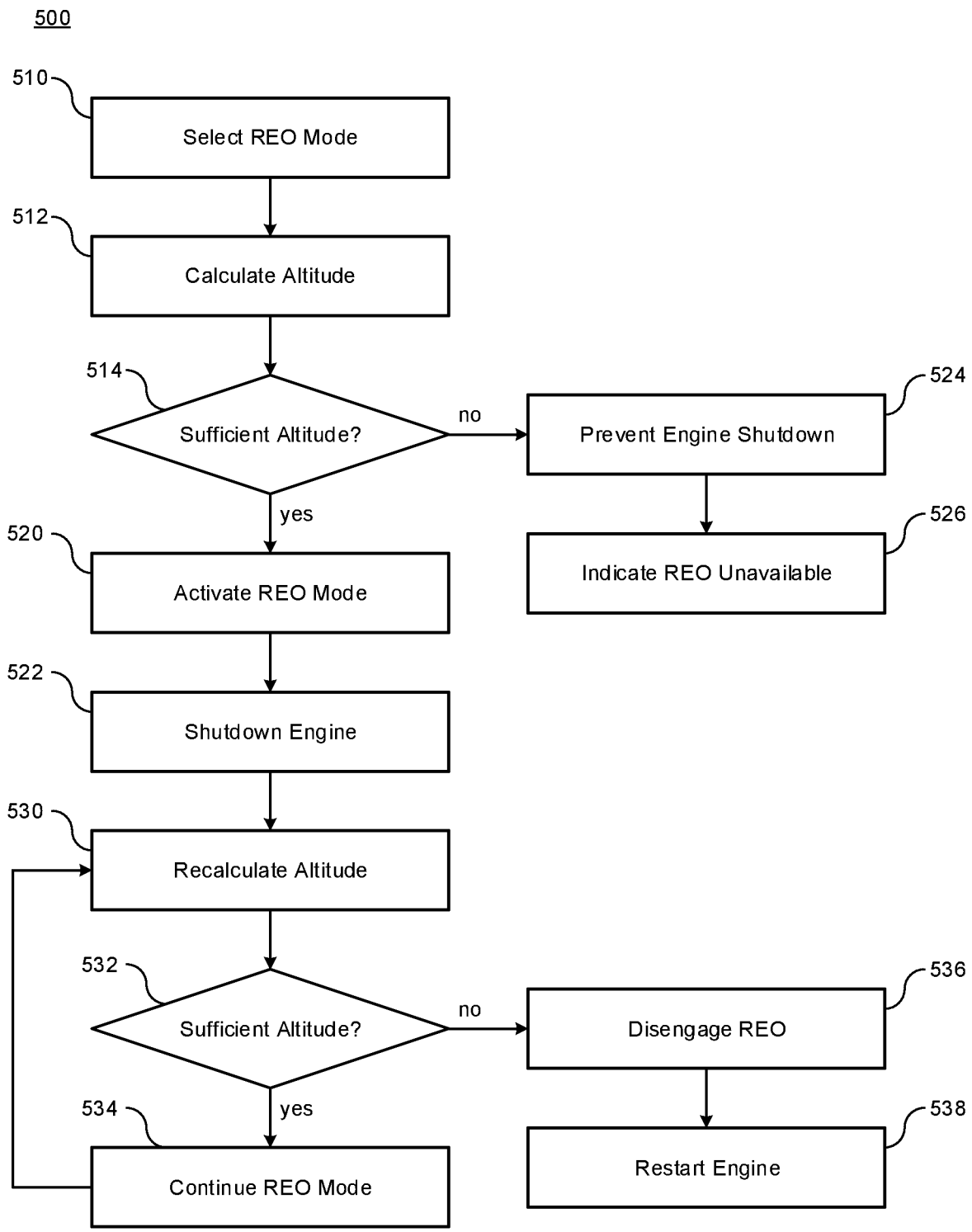
FIG. 5 illustrates a diagram of a method for utilizing a reduced-engine operation technique for a rotorcraft in accordance with implementations described herein.

FIG. 5 illustrates a diagram of a method 500 for utilizing a REO technique for the rotorcraft 104 in accordance with various implementations described herein.

It should be understood that even though method 500 indicates a particular order of operation execution, in some cases, various portions of operations may be executed in a different order, and on different systems. In other cases, additional operations and/or steps may be added to and/or omitted from method 500. Also, method 500 may be implemented in hardware and/or software. For instance, if implemented in hardware, method 500 may be implemented with various components and/or circuitry, as described in FIGS. 1-3 and 4A-4B. In some instances, if implemented in software, method 500 may be implemented as a program or software instruction process that is configured for providing REO techniques for the rotorcraft 104, as described herein. Also, if implemented in software, instructions related to implementing method 500 may be stored in memory and/or a database. Thus, in various implementations, a computer or various other types of computing devices with a processor and memory may be configured to perform method 500.

As described in reference to FIG. 5, the method 500 may be used for fabricating and/or manufacturing, or causing to be fabricated and/or manufactured, an integrated circuit (IC) for a flight control system that implements the various REO techniques in physical design as described herein so as to thereby provide rotorcraft architecture with the REO functionality using various related devices, components and/or circuitry as described herein.

At block 510, method 500 may select REO mode, and at block 512, method 500 may calculate altitude, such as, e.g., a minimum required altitude. At decision block 514, method 500 may determine if sufficient altitude is available for REO mode. Also, method 500 may be configured to continuously calculate altitude of the rotorcraft for REO based on one or more of an aircraft descent rate (ADR) and an engine restart time (ERT). If sufficient altitude is not available, then at block 524, method 500 may prevent engine shutdown, and at block 526, method 500 may indicate that REO mode is not available to a pilot via a pilot display. Otherwise, if sufficient altitude is available, then at block 520, method 500 may activate the REO mode, and method 500 may indicate that REO mode is available to the pilot via the pilot display. At block 522, method 500 may shutdown at least one engine of multiple engines during REO mode. In various implementations, the term shutdown may refer to sub-idle pulse modulation of an engine, and also, REO may refer to sub-idle operation of an engine, idle operation of an engine, and/or pulse modulating an engine.

Also, at block 530 method 500 may recalculate altitude, such as, e.g., a minimum required altitude. At decision block 532, method 500 may determine if sufficient altitude is available for REO mode. If sufficient altitude is not available, then at block 536, method 500 may disengage REO mode, and also, at block 538, method 500 may restart the at least one engine and then indicate that REO is not available to the pilot via the pilot display. Otherwise, at block 534, method 500 may continue REO mode if sufficient altitude is available, and method 500 may return to block 530 to recalculate altitude. As such, in various scenarios of operation, method 500 may be configured to continuously and/or iteratively pass through one or more blocks 530, 532, 534 while sufficient altitude is available for REO mode, or at least until insufficient altitude is calculated, whereby method 500 disengages REO mode at block 536 and then restarts the at least one engine at block 538.

In some implementations, as described in reference to FIG. 5, method 500 may be configured to interface with multiple engines in a rotorcraft, and also, method 500 may be configured to continuously calculate minimum altitude of the rotorcraft for REO based on one or more of an aircraft descent rate (ADR) and an engine restart time (ERT). Also, method 500 may be configured to shutdown at least one engine of multiple engines if the altitude is determined to be a sufficient altitude for REO. Also, method 500 may be configured to restart the at least one engine of the multiple engines if the altitude is determined to be an insufficient altitude for REO. Also, in some scenarios, the multiple engines may have two or more engines, and REO may refer to a high-efficiency mode of operation for shutting-down at least one engine of the two or more engines. In other instances, the multiple engines may have two engines, and the REO may refer to a reduced-engine cruise or a single-engine cruise (SEC) mode of operation for shutting-down at least one engine of the two engines. Also, in various operational scenarios, REO may include pulse modulation of at least one engine at idle engine speed or sub-idle engine speed during flight.

In some implementations, the aircraft descent rate (ADR) may be based on current ambient conditions related to the altitude including outside ambient temperature (OAT) during autorotation of the aircraft (or rotorcraft) with the at least one engine of the multiple engines shutdown. Also, the engine restart time (ERT) may refer to a function of the current ambient conditions related to one or more of the current altitude, outside ambient temperature (OAT), and measured gas temperature (MGT) of the at least one engine. Also, the altitude may be continuously calculated as a minimum altitude needed for REO based on a pre-determined balance between the aircraft descent rate (ADR) and the engine restart time (ERT). Also, in various operational scenarios, one or more steps in method 500 may be manually selected based on input from a pilot, and/or one or more steps in method 500 may be automatically selected by a flight control computer, such as, e.g., the flight control system 310. Moreover, in various other operational scenarios, the steps in method 500 may be performed with some combination of manual selection by pilot and automatic selection by a flight control computer, such as, e.g., the flight control system 310 in FIG. 3.

Figure 6A:
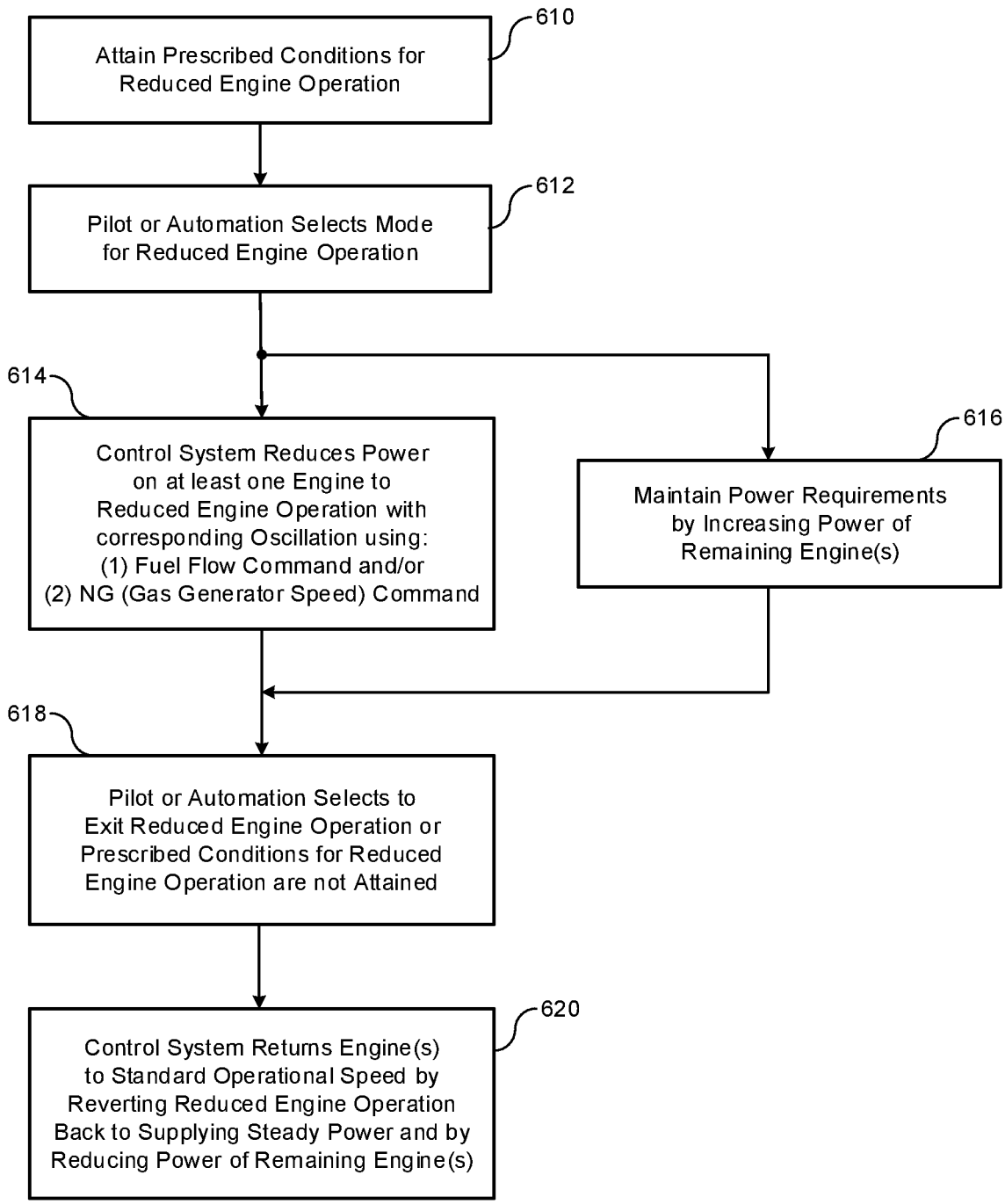
FIGS. 6A-6C illustrate diagrams of methods for using a pulse modulation technique for gas turbine engines in accordance with implementations described herein.
Figure 6B:
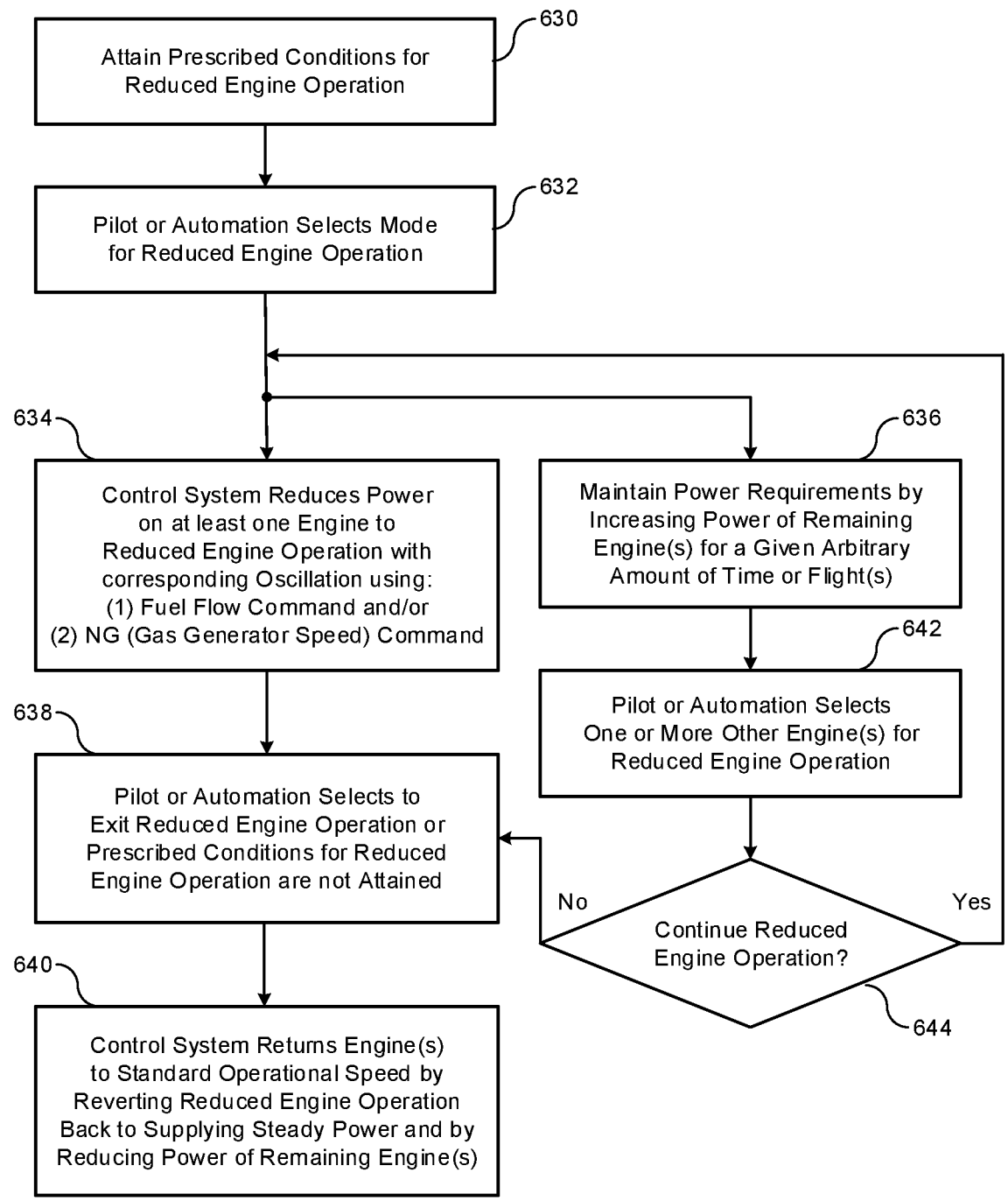
Figure 6C:
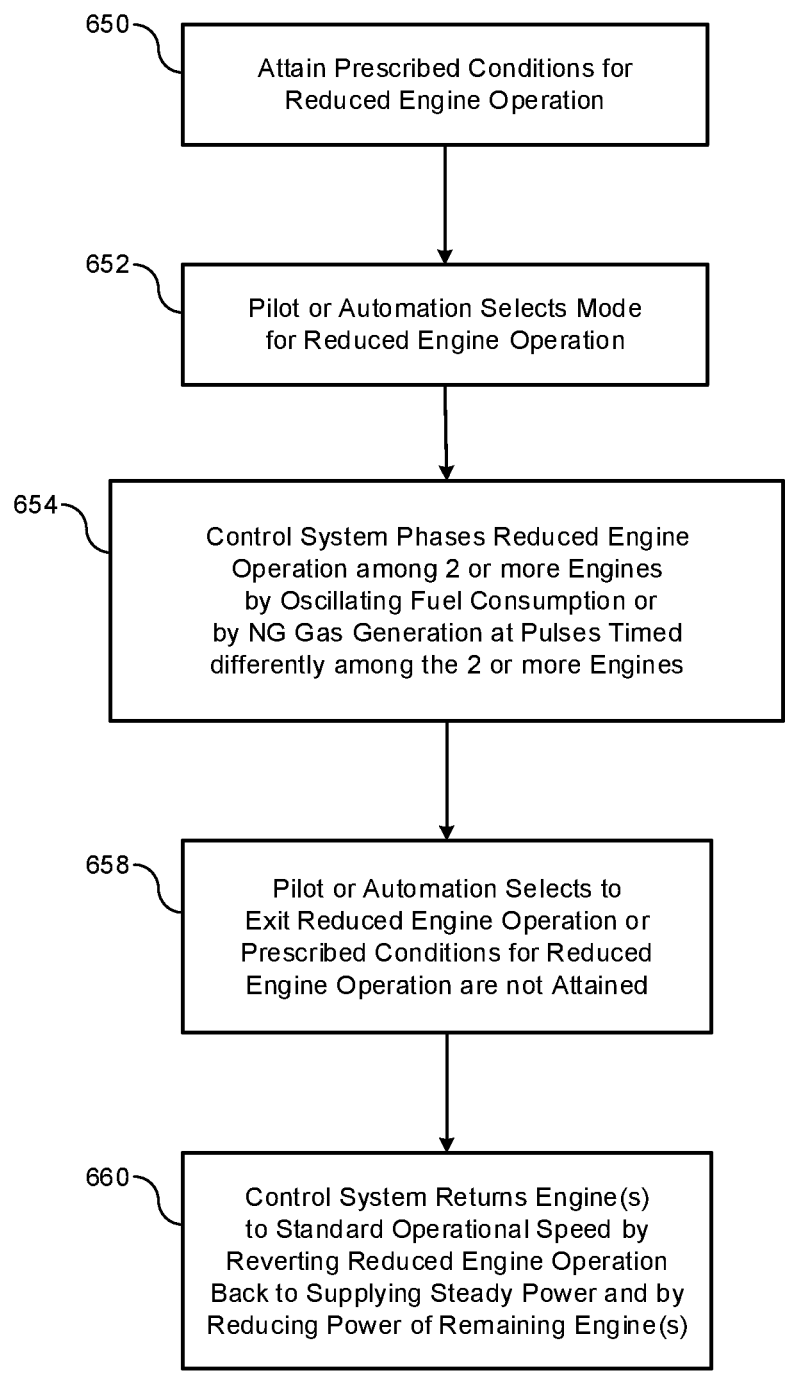

FIGS. 6A-6C illustrate various diagrams of methods for using a pulse modulation technique for gas turbine engines in accordance with implementations described herein.

FIG. 6A illustrates a process diagram of a method 600A for using pulse modulation schemes and techniques for reducing fuel consumption of gas turbine engines in accordance with various implementations described herein. In some scenarios, method 600A may be used for reducing fuel consumption of at least one engine in a multiple engine configuration during reduced engine operation (REO) by pulse modulating fuel delivery to the at least one engine of the multiple engine configuration. In some other scenarios, method 600A may be used for shutting-down at least one engine of the multiple engine configuration during a single-engine cruise mode of operation, wherein method 600A may reduce fuel consumption of at least one other engine of the multiple engine configuration during single-engine cruise mode by pulse modulating fuel delivery to the at least one other engine.

It should be understood that even though method 600A indicates a particular order of operation execution, in some cases, various portions of operations may be executed in a different order, and on different systems. In other cases, additional operations and/or steps may be added to and/or omitted from method 600. Also, method 600A may be implemented in hardware and/or software. For instance, if implemented in hardware, method 600A may be implemented with various components, circuits and/or methods, e.g., as described in FIGS. 1-3, 4A-4B and 5. Also, if implemented in software, method 600A may be implemented as a program or software instruction process configured for providing pulse modulation schemes and techniques for the rotorcraft 104, as described herein. Also, if implemented in software, various instructions related to implementing method 600A may be stored in memory and/or a database. Thus, in various implementations, a computer or various other types of computing devices with a processor and memory may be configured to perform method 600.

As described in reference to FIG. 6A, method 600A may be used for fabricating and/or manufacturing, or causing to be fabricated and/or manufactured, an integrated circuit (IC) for a flight control system that implements the various REO techniques in physical design as described herein so as to thereby provide rotorcraft architecture with the REO functionality using various related devices, components and/or circuitry as described herein.

At block 610, method 600A may interface with multiple engines in a rotorcraft so as to attain the prescribed conditions for reduced engine operation (REO). At block 612, method 600A may interface with a pilot (e.g., via a pilot interface) or some type of automation so that the pilot or automation is able to select the mode for reduced engine operation (REO). In some cases, method 600A may be configured to continuously calculate altitude of the rotorcraft for reduced engine operation (REO), such that method 600A allows the pilot to select REO if sufficient altitude is available for REO.

At block 614, method 600A may interface with a flight control system of the rotorcraft to reduce power on at least one engine to reduced engine operation (REO) with corresponding oscillation using a fuel flow command and/or an Ng gas generator speed command. In some scenarios, method 600A may pulse modulate fuel delivery to at least one engine of the multiple engine configuration during REO so as to reduce fuel consumption of the at least one engine of the multiple engine configuration during REO. In some other scenarios, method 600A may shutdown at least one engine during a single-engine cruise mode of operation. At block 616, method 600A may maintain power requirements by increasing power of remaining engines.

At block 618, method 600A may exit REO when the pilot or automation selects to exit REO or when prescribed conditions for REO are not attained. At block 620, method 600A may interface with the flight control system so as to return the engines in the multiple engine configuration to standard operational speed by reverting the reduced engine operation (REO) to supplying steady power and/or by reducing power of the remaining engines.

In various implementations, upon selective activation of REO by the pilot, the flight control system is configured to adjust operation of the at least one other engine by throttling the at least one other engine to IDLE or sub-IDLE. Upon selective activation of REO by the pilot, the flight control system is configured to maintain IDLE or sub-IDLE via oscillating fuel flow to the at least one other engine during reduced-engine operation, and by maintaining an IDLE or sub-IDLE operation condition, the at least one other engine may have a faster engine restart time. Also, in some scenarios, increasing fuel delivery to the at least one other engine and providing corresponding advisory messages to a pilot if altitude drops significantly while in reduced-engine operation during flight.

In various implementations, while in REO during flight, if altitude drops significantly, then method 600A may interface with the flight control system so as to increase fuel delivery to the at least one other engine and provide corresponding advisory messages to a pilot. Also, method 600A may interface with the flight control system so as to shutdown at least one engine of the multiple engines during single-engine cruise by continuously calculating altitude based on one or more of an aircraft descent rate and an engine restart time.

FIG. 6B illustrates a process diagram of a method 600B for using pulse modulation schemes and techniques for reducing fuel consumption of gas turbine engines in accordance with various implementations described herein. In some scenarios, method 600B may be used for reducing fuel consumption of at least one engine in a multiple engine configuration during reduced engine operation (REO) by pulse modulating fuel delivery to the at least one engine of the multiple engine configuration. In some other scenarios, method 600B may be used for shutting-down at least one engine of the multiple engine configuration during a single-engine cruise mode of operation, wherein method 600B may reduce fuel consumption of at least one other engine of the multiple engine configuration during single-engine cruise mode by pulse modulating fuel delivery to the at least one other engine.

It should be understood that even though method 600B indicates a particular order of operation execution, in some cases, various portions of operations may be executed in a different order, and on different systems. In other cases, additional operations and/or steps may be added to and/or omitted from method 600. Also, method 600B may be implemented in hardware and/or software. For instance, if implemented in hardware, method 600B may be implemented with various components, circuits and/or methods, e.g., as described in FIGS. 1-3, 4A-4B and 5. If implemented in software, method 600B may be implemented as a program or software instruction process configured for providing pulse modulation schemes and techniques for the rotorcraft 104, as described herein. Also, if implemented in software, various instructions related to implementing method 600B may be stored in memory and/or a database. Thus, a computer or various other types of computing devices with a processor and memory may be configured to perform method 600.

As described in reference to FIG. 6B, method 600B may be used for fabricating and/or manufacturing, or causing to be fabricated and/or manufactured, an integrated circuit (IC) for a flight control system that implements the various reduced engine operation (REO) techniques in physical design as described herein so as to thereby provide rotorcraft architecture with the REO functionality using various related devices, components and/or circuitry as described herein.

At block 630, method 600B may interface with multiple engines in a rotorcraft so as to attain the prescribed conditions for reduced engine operation (REO). At block 632, method 600B may interface with a pilot (e.g., via a pilot interface) or some type of automation so that the pilot or automation is able to select the mode for reduced engine operation (REO). In some cases, method 600B may be configured to continuously calculate altitude of the rotorcraft for reduced engine operation (REO), such that method 600B allows the pilot to select REO if sufficient altitude is available for REO.

At block 634, method 600B may interface with a flight control system of the rotorcraft to reduce power on at least one engine to reduced engine operation (REO) with corresponding oscillation using a fuel flow command and/or an Ng gas generator speed command. In some scenarios, method 600B may pulse modulate fuel delivery to at least one engine of the multiple engine configuration during reduced engine operation (REO) so as to thereby reduce fuel consumption of the at least one engine of the multiple engine configuration during REO. In some other scenarios, method 600B may shutdown at least one engine during a single-engine cruise mode of operation.

At block 636, method 600B may maintain power requirements by increasing power of remaining engines for a given arbitrary amount of time or flight(s). At block 642, method 600B may interface with the pilot (e.g., via a pilot interface) or automation so that the pilot or automation is able to select one or more other remaining engines for reduced engine operation (REO). At decision block 644, method 600B may determine whether to continue reduced engine operation (REO) or rescind REO. If yes, then method 600B returns to block 634. If no, then method 600B proceeds to block 638.

At block 638, method 600B may exit REO when the pilot or automation selects to exit REO or when prescribed conditions for REO are not attained. At block 640, method 600B may interface with the flight control system so as to return the engines in the multiple engine configuration to standard operational speed by reverting reduced engine operation (REO) to supplying steady power and/or by reducing power of the remaining engines.

In various implementations, upon selective activation of REO by the pilot, the flight control system is configured to adjust operation of the at least one other engine by throttling the at least one other engine to IDLE or sub-IDLE. Upon selective activation of REO by the pilot, the flight control system is configured to maintain IDLE or sub-IDLE via oscillating fuel flow to the at least one other engine during reduced-engine operation, and by maintaining an IDLE or sub-IDLE operation condition, the at least one other engine may have a faster engine restart time. Also, in some scenarios, increasing fuel delivery to the at least one other engine and providing corresponding advisory messages to a pilot if altitude drops significantly while in reduced-engine operation during flight.

In various implementations, while in REO during flight, if altitude drops significantly, then method 600B may interface with the flight control system so as to increase fuel delivery to the at least one other engine and provide corresponding advisory messages to a pilot. Also, method 600B may interface with the flight control system so as to shutdown at least one engine of the multiple engines during single-engine cruise by continuously calculating altitude based on one or more of an aircraft descent rate and an engine restart time.

FIG. 6C illustrates a process diagram of a method 600C for using pulse modulation schemes and techniques for reducing fuel consumption of gas turbine engines in accordance with various implementations described herein. In some scenarios, method 600C may be used for reducing fuel consumption of at least one engine in a multiple engine configuration during reduced engine operation (REO) by pulse modulating fuel delivery to the at least one engine of the multiple engine configuration. In some other scenarios, method 600C may be used for shutting-down at least one engine of the multiple engine configuration during a single-engine cruise mode of operation, wherein method 600C may reduce fuel consumption of at least one other engine of the multiple engine configuration during single-engine cruise mode by pulse modulating fuel delivery to the at least one other engine.

It should be understood that even though method 600C indicates a particular order of operation execution, in some cases, various portions of operations may be executed in a different order, and on different systems. In other cases, additional operations and/or steps may be added to and/or omitted from method 600. Also, method 600C may be implemented in hardware and/or software. For instance, if implemented in hardware, method 600C may be implemented with various components, circuits and/or methods, e.g., as described in FIGS. 1-3, 4A-4B and 5. Also, if implemented in software, method 600C may be implemented as a program or software instruction process configured for providing pulse modulation schemes and techniques for the rotorcraft 104, as described herein. Also, if implemented in software, various instructions related to implementing method 600C may be stored in memory and/or a database. Thus, in various implementations, a computer or various other types of computing devices with a processor and memory may be configured to perform method 600.

As described in reference to FIG. 6C, method 600C may be used for fabricating and/or manufacturing, or causing to be fabricated and/or manufactured, an integrated circuit (IC) for a flight control system that implements various reduced engine operation (REO) techniques in physical design as described herein so as to thereby provide rotorcraft architecture with the REO functionality using various related devices, components and/or circuitry as described herein.

At block 650, method 600C may interface with multiple engines in a rotorcraft so as to attain the prescribed conditions for reduced engine operation (REO). At block 652, method 600C may interface with a pilot (e.g., via a pilot interface) or some type of automation so that the pilot or automation is able to select the mode for reduced engine operation (REO). In some cases, method 600C may be configured to continuously calculate altitude of the rotorcraft for reduced engine operation (REO), such that method 600C allows the pilot to select REO if sufficient altitude is available for REO.

At block 654, method 600C may interface with a flight control system of the rotorcraft to phase reduced engine operation (REO) among two or more engines by oscillating fuel consumption or by NG gas generation at pulses timed differently among the 2 or more engines. In some scenarios, method 600C may pulse modulate fuel delivery to at least one engine of the multiple engine configuration during REO so as to reduce fuel consumption of the at least one engine of the multiple engine configuration during REO. In some other scenarios, method 600C may shutdown at least one engine during a single-engine cruise mode of operation.

At block 658, method 600C may exit REO when the pilot or automation selects to exit REO or when prescribed conditions for REO are not attained. At block 660, method 600C may interface with the flight control system so as to return the engines in the multiple engine configuration to standard operational speed by reverting reduced engine operation (REO) to supplying steady power and/or by reducing power of the remaining engines.

In various implementations, upon selective activation of REO by the pilot, the flight control system is configured to adjust operation of the at least one other engine by throttling the at least one other engine to IDLE or sub-IDLE. Upon selective activation of REO by the pilot, the flight control system is configured to maintain IDLE or sub-IDLE via oscillating fuel flow to the at least one other engine during reduced-engine operation, and by maintaining an IDLE or sub-IDLE operation condition, the at least one other engine may have a faster engine restart time. Also, in some scenarios, increasing fuel delivery to the at least one other engine and providing corresponding advisory messages to a pilot if altitude drops significantly while in reduced-engine operation during flight.

In various implementations, while in REO during flight, if altitude drops significantly, then method 600C may interface with the flight control system so as to increase fuel delivery to the at least one other engine and provide corresponding advisory messages to a pilot. Also, method 600C may interface with the flight control system so as to shutdown at least one engine of the multiple engines during single-engine cruise by continuously calculating altitude based on one or more of an aircraft descent rate and an engine restart time.

Figure 6D:
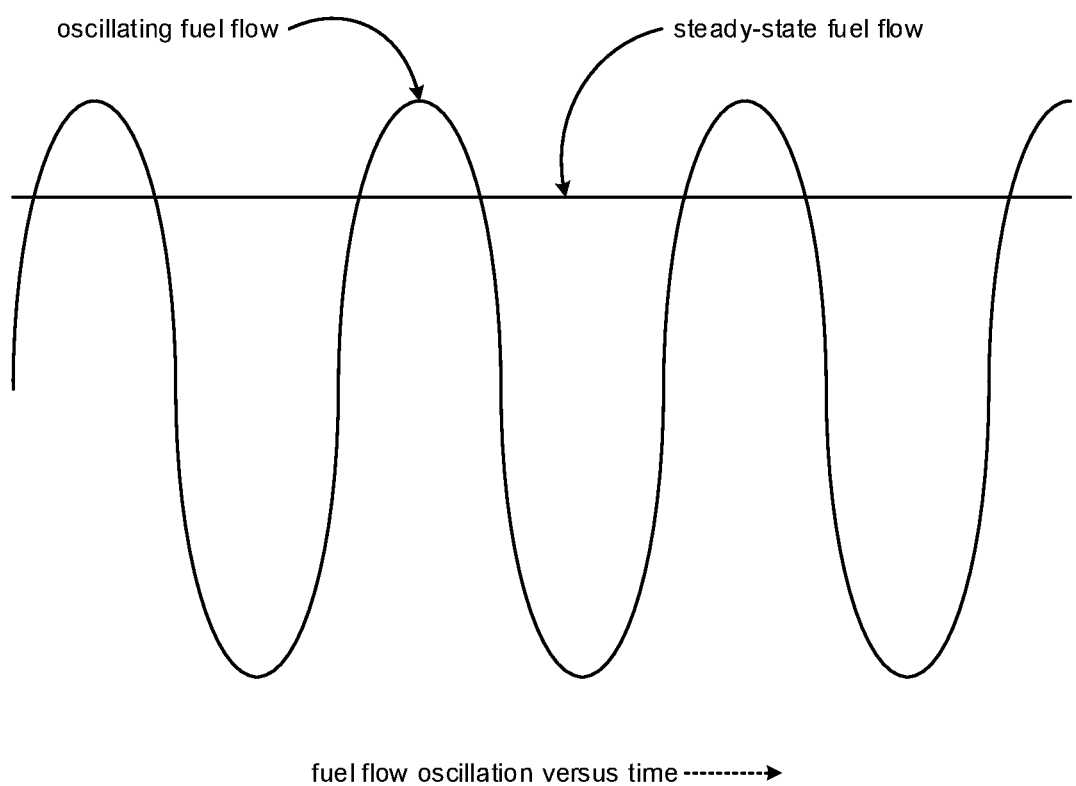
FIG. 6D illustrates a diagram of fuel flow oscillation for sub-idle operation of an engine in accordance with implementations described herein.

FIG. 6D illustrates a waveform diagram 600D of fuel flow oscillation for sub-idle operation of an engine 604 in accordance with implementations described herein.

In some implementations, the fuel flow oscillation for sub-idle operation of at least one engine 654 provides for oscillating fuel flow of at least one engine in an aircraft so as to maintain a sub-idle operational condition during flight. Oscillating fuel flow may allow for fuel savings greater than steady-state fuel flow. In reference to the waveform diagram 650, area under each curve represents total fuel burn for oscillating fuel flow and steady-state fuel flow, wherein the oscillating fuel flow has a reduce area under its curve in contrast to steady-state fuel flow under its curve. Therefore, an oscillating command results in fuel savings, and thus, as a result, oscillating fuel flow allows for below sub-idle engine operation with lower mean fuel flow in contrast to a steady-state sub-idle operational condition.

Figure 7:
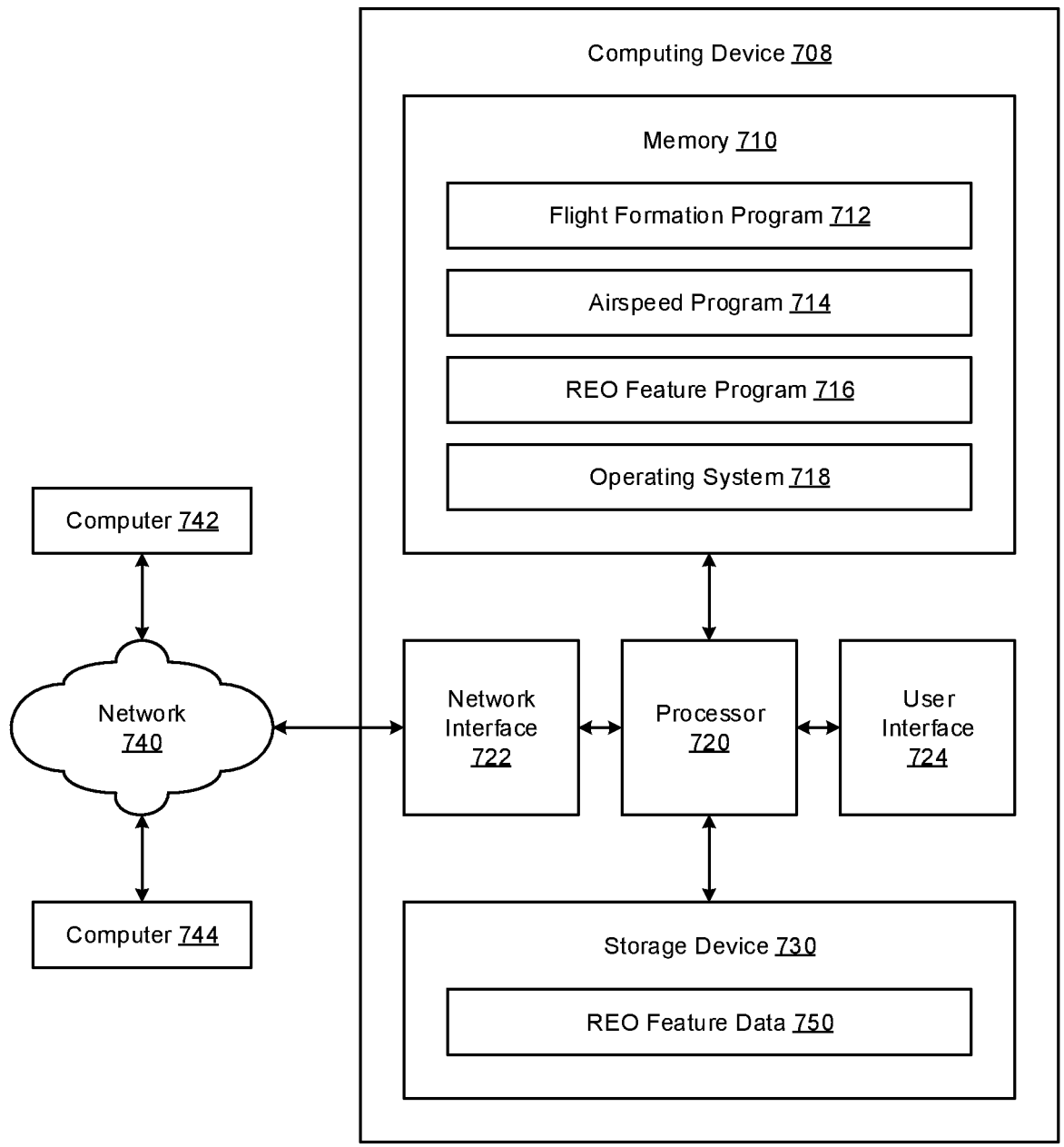
FIG. 7 illustrates a diagram of a computer system for utilizing a reduced-engine operation technique for a rotorcraft in accordance with implementations described herein.

FIG. 7 illustrates a diagram 700 of a flight computer system 704 for utilizing REO techniques for a rotorcraft in accordance with implementations described herein. In various implementations, the flight computer system 704 may be utilized for pulse modulating fuel delivery to one or more engines of a multi-engine rotorcraft so as to reduce fuel consumption of the multi-engine rotorcraft in accordance with implementations described herein. In various implementations, the flight computer system 704 may be configured to perform any one or more or all of methods 600A, 600B, 600C in reference to FIGS. 6A, 6B, 6C, respectively.

The flight computer system 704 (e.g., networked computer system and/or server) is shown in FIG. 7 for the rotorcraft 104 in FIG. 1. The flight computer system 704 may be used to determine, calculate and correct (i.e., adjust) an angle-of-attack parameter (i.e., orientation) for the rotorcraft 104. The flight computer system 704 has a computing device 708 (e.g., computer, flight computer system, flight controls and/or avionics computer system), which may be implemented as a server or a multi-use computer that is coupled via a network 740 to one or more networked (client) computers 742, 744. Various methods, such as, e.g., method 500 in FIG. 5 and/or method 600A in FIG. 6, may be stored as program code (e.g., flight formation program 712, airspeed program 714, REO feature program 716) in memory that may be performed by the computing device 708, the computers 742, 744, various other networked devices (not shown) or a combination thereof. In some instances, the programs 712, 714, 716 may read input data (e.g., measurements from sensors 340 in FIG. 3 and operating pilot data) and then provide controlled output data to various connected computer systems including, e.g., an associated closed-loop control system.

In various implementations, the computers 708, 742, 744 may refer to any type of computing device, computer system, or some other programmable electronic device having a processor 720 and memory 710. The computers 708, 742, 744 may be implemented using one or more networked (e.g., wired or wirelessly networked) computers, e.g., in a cluster or some other distributed computer system. The computers 708, 742, 744 may be implemented within a single computer or various programmable electronic devices, e.g., an aircraft flight control computer, a ground-based flight control system, a flight monitoring terminal, a laptop computer, a hand-held computer, phone, tablet, or similar. In some instances, the computing device 708 may refer to an onboard flight control computer (e.g., configured to receive sensor data from the rotorcraft 104) on a dispensing aircraft. In this instance, the computing device 708 may be disposed on the rotorcraft 104 to transmit aircraft data to the external networked computers 742, 744 that receive the aircraft data from the rotorcraft 104. Also, the external networked computers 742, 744 may be a part of the flight computer system 704 at a ground location monitoring the rotorcraft 104 and any sensor data related thereto.

In some implementations, the computing device 708 may have the processor 720, such as, e.g., central processing unit (CPU), coupled to the memory 710, a network interface 722 and a user interface 724, such as, e.g., the control interface 362 and/or the pilot display 360 in FIG. 3. The memory 710 may represent random access memory (RAM) devices of the main in the computing device 708, supplemental levels of memory (e.g., cache memory, non-volatile or backup memory (e.g., programmable or flash memory)), read-only memory, or combinations thereof. In addition to the memory 710, the flight computer system 704 may include other memory located elsewhere in the computing device 708, such as, e.g., cache memory in the processor 720, as well as any storage capacity used as a virtual memory (e.g., as stored on a storage device 720 or on another computer coupled to the computing device 708). The memory 710 may have stored thereon various programs, including, e.g., the flight formation program 712, the airspeed program 714, and the REO feature program 716 along with an operating system 718 for onboard operation of the computing device 708.

The computing device 708 may further be configured to communicate information externally to the external network 740 via the network interface 722. To interface with a user, pilot, and/or other operator (e.g., aerodynamicist, engineer), the computing device 708 may include a user interface 724 incorporating one or more user input devices (e.g., a keyboard, a mouse, a touchpad, and/or a microphone, etc.) and a display (e.g., a monitor, a liquid crystal display (LCD) panel, light emitting diode (LED), display panel, and/or speaker, etc.). Also, in other instances, the user input may be received via another computer or terminal. Moreover, the computing device 708 may include the network interface 740, which may be coupled to one or more networks 740 (e.g., a wireless network) to enable communication of information with other computers and electronic devices. The computing device 708 may have analog and/or digital interfaces between the processor 720 and each of the components 722, 724, 730, and also, other non-limiting hardware components and/or environments may be used within the context of illustrated examples and implementations.

The computing device 708 may operate under the control of the operating system 718, and also, the computing device 708 may execute or otherwise rely on various computer software applications, components, programs, objects, modules, data structures, etc. (such as, e.g., the flight formation program 712, the airspeed program 714, and the REO feature program 716 (including oscillating fuel supply to one or more engines, as described herein), along with related software). The operating system 718 may be stored in the memory 710, and the operating system 718 may refer to, but are not limited to, UNIX® (a registered trademark of The Open Group), Linux® (a registered trademark of Linus Torvalds), Windows® (a registered trademark of Microsoft Corporation, Redmond, WA, United States), AIX® (a registered trademark of International Business Machines (IBM) Corp., Armonk, NY, United States) i5/OS® (a registered trademark of IBM Corp.), and others as will occur to those of skill in the art. The operating system 718, the flight formation program 712, the airspeed program 714, and the REO feature program 716 are shown in the memory 710, but components of the aforementioned software may also, or in addition, be stored at non-volatile memory (e.g., on storage device 730 (data storage) and/or other non-volatile memory (not shown). Moreover, various applications, components, programs, objects, modules, etc. may execute on one or more processors in another computer coupled to the computing device 708 via the network 740 (e.g., in a distributed or client-server computing environment) where processing to implement the functions of a computer program may be allocated to multiple computers 742, 744 over the network 740. Also, REO data 750 may be stored in storage device 730 for retrieval by the processor 720 and/or the memory 710.

It should be intended that the subject matter of the claims not be limited to various implementations and/or illustrations provided herein, but should include any modified forms of those implementations including portions of implementations and combinations of various elements in reference to different implementations in accordance with the claims. It should also be appreciated that in development of any such implementation, as in any engineering or design project, numerous implementation-specific decisions should be made to achieve developers' specific goals, such as, e.g., compliance with system-related constraints and/or business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of an aircraft having a multi-engine configuration with multiple engines. The aircraft may have a flight control system coupled to the multiple engines with a multi-engine interface. The flight control system may be configured to reduce fuel consumption of at least one engine of the multiple engines during reduced-engine operation by pulse modulating fuel delivery to the at least one engine of the multiple engines.

Described herein are various implementations of an aircraft having a multi-engine configuration with multiple engines of three or more engines. The aircraft may have a flight control system coupled to the multiple engines with a multi-engine interface. The flight control system may be configured to shutdown at least one engine of the multiple engines during reduced engine operation. The flight control system may be configured to reduce fuel consumption of at least one other engine of the multiple engines during the reduced engine operation by pulse modulating fuel delivery to the at least one other engine of the multiple engines.

Described herein are various implementations of a method. The method may interface with multiple engines in a rotorcraft. The method may continuously calculate altitude of the rotorcraft for reduced-engine operation. The method may pulse modulate fuel delivery to at least one engine of the multiple engines during the reduced-engine operation so as to reduce fuel consumption of the at least one engine of the multiple engines during the reduced-engine operation.

Reference has been made in detail to various implementations, examples of which are illustrated in accompanying drawings and figures. In the following detailed description, numerous specific details are set forth to provide a thorough understanding of the disclosure provided herein. However, the disclosure provided herein may be practiced without these specific details. In various implementations, well-known methods, procedures, components, circuits and networks have not been described in detail so as not to unnecessarily obscure details of the embodiments.

It should also be understood that, although various terms first, second, etc. may be used herein to describe various elements, these elements should not be limited by these terms. These terms are only used to distinguish one element from another. For instance, a first element could be termed a second element, and, similarly, a second element could be termed a first element. Also, the first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and various other similar terms that indicate relative positions above or below a given point or element may be used in connection with various implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, specific features and/or acts described above are disclosed as example forms of implementing the claims.

What is claimed is:

1. An aircraft comprising:
a multi-engine configuration with multiple engines; and
a flight control system coupled to the multiple engines with a multi-engine interface, wherein the flight control system is configured to:
reduce fuel consumption of at least one engine of the multiple engines during reduced-engine operation by pulse modulating fuel delivery to the at least one engine of the multiple engines;
calculate a minimum altitude of the aircraft for reduced-engine operation; and
restart the at least one engine if a current altitude of the aircraft drops below the minimum altitude.

2. The aircraft of claim 1, wherein:
during the reduced-engine operation, the flight control system is configured to adjust operation of the at least one engine of the multiple engines by throttling the at least one engine to IDLE or sub-IDLE.

3. The aircraft of claim 2, wherein:
the flight control system is configured to maintain IDLE or sub-IDLE via oscillating fuel flow to the at least one engine during the reduced-engine operation.

4. The aircraft of claim 3, wherein:
by maintaining an IDLE or sub-IDLE operation condition, the at least one engine has a reduced time required to produce and contribute additional engine power available.

5. The aircraft of claim 1, wherein:
the flight control system is configured to selectively reduce engine power to at least one other engine of the multiple engines based on input from a pilot, and the flight control system is configured to provide visual indication of the at least one other engine selectively operating with reduced engine power by the pilot.

6. The aircraft of claim 5, wherein:
upon selective reduction in engine power to at least one other engine by the pilot or by automated means, the flight control system is configured to adjust operation of the at least one other engine of the multiple engines by throttling the at least one other engine to IDLE, sub-IDLE, or completely OFF.

7. The aircraft of claim 5, wherein the flight control system is configured to selectively reduce engine power of the at least one other engine of the multiple engines by continuously calculating altitude for the reduced-engine operation based on an aircraft descent rate of the at least one other engine.

8. The aircraft of claim 7, wherein:
the aircraft descent rate is based on current ambient conditions related to the altitude including outside ambient temperature during autorotation of the aircraft with the at least one engine of the multiple engines operating with reduced engine power.

9. The aircraft of claim 1, wherein:
the aircraft comprises a rotorcraft, and
the multiple engines comprise multiple turbo-shaft engines.

10. A method comprising:
interfacing with multiple engines in an aircraft, the aircraft having a multiple engine configuration;
continuously calculating a minimum altitude of the aircraft for reduced-engine operation;
reducing fuel consumption of at least one engine of the multiple engines by pulse modulating fuel delivery to the at least one engine of the multiple engines during the reduced-engine operation; and
restarting the at least one engine if a current altitude of the aircraft drops below the minimum altitude.

11. The method of claim 10, further comprising:
during reduced-engine operation, adjusting operation of the at least one engine of the multiple engines by throttling the at least one engine to IDLE or sub-IDLE.

12. The method of claim 11, further comprising:
maintaining IDLE or sub-IDLE via oscillating fuel flow to the at least one engine during the reduced-engine operation,
wherein, by maintaining an IDLE or sub-IDLE operation condition, the at least one engine has a faster engine restart time.

13. The method of claim 10, further comprising:
increasing fuel delivery to the at least one engine and providing corresponding advisory messages to a pilot if altitude drops significantly while in reduced-engine operation during flight.

14. The aircraft of claim 1, wherein the flight control system is configured to calculate the minimum altitude for reduced-engine operation based on a descent rate of the aircraft and an engine restart time of the at least one engine.

15. The method of claim 10, wherein calculating the minimum altitude for reduced-engine operation is based on a descent rate of the aircraft and an engine restart time of the at least one engine.

* * * * *